(12) United States Patent
Loch et al.

(10) Patent No.: US 8,168,261 B2
(45) Date of Patent: May 1, 2012

(54) PROCESS FOR APPLYING A HEAT SHIELDING COATING SYSTEM ON A METALLIC SUBSTRATE

(75) Inventors: Ing Michael Loch, Wehr (DE); Gérard Barbezat, Opfikon (CH)

(73) Assignee: Sulzer Metco A.G. (CH)

( * ) Notice: Subject to any disclaimer, the term of this patent is extended or adjusted under 35 U.S.C. 154(b) by 857 days.

(21) Appl. No.: 10/103,426

(22) Filed: Mar. 21, 2002

(65) Prior Publication Data

US 2003/0008167 A1 Jan. 9, 2003

(30) Foreign Application Priority Data

May 23, 2001 (CH) .......................................... 955/01

(51) Int. Cl.
*C23C 4/06* (2006.01)
*C23C 4/10* (2006.01)
*C23C 4/12* (2006.01)

(52) U.S. Cl. ........................ 427/454; 427/456
(58) Field of Classification Search .................. 427/454, 427/456; 29/889.7, 889, 889.71
See application file for complete search history.

(56) References Cited

U.S. PATENT DOCUMENTS

| | | | |
|---|---|---|---|
| 3,912,235 A * | 10/1975 | Janssen | 366/142 |
| 4,321,310 A | 3/1982 | Ulion et al. | |
| 4,321,311 A * | 3/1982 | Strangman | 428/623 |
| 4,409,659 A | 10/1983 | Devine | |
| 4,576,874 A * | 3/1986 | Spengler et al. | 428/623 |
| 4,723,589 A * | 2/1988 | Iyer et al. | 164/46 |
| 5,238,753 A | 8/1993 | Ryoke et al. | |
| 5,302,465 A | 4/1994 | Miller et al. | |
| 5,514,482 A | 5/1996 | Strangman | |
| 5,853,815 A * | 12/1998 | Muehlberger | 427/446 |
| 6,045,928 A * | 4/2000 | Tsantrizos et al. | 428/623 |
| 6,057,011 A | 5/2000 | McKechnie et al. | |
| 6,218,029 B1 * | 4/2001 | Rickerby | 428/615 |

FOREIGN PATENT DOCUMENTS

| | | |
|---|---|---|
| DE | 196 44 153 A1 | 4/1989 |
| DE | 41 14 962 A1 | 11/1992 |
| DE | 197 41 961 A1 | 3/1998 |
| DE | 196 44 153 A1 | 4/1998 |
| EP | 0 223 104 A1 | 5/1987 |
| EP | 0 783 043 A1 | 7/1997 |
| EP | 0 845 547 A1 | 6/1998 |
| EP | 0 935 010 A1 | 8/1999 |
| EP | 0 985 745 A1 | 3/2000 |
| JP | 63049268 A | 3/1988 |
| JP | 06088197 A | 3/1994 |
| JP | 06220603 A | 8/1994 |
| WO | WO 89/07159 | 8/1989 |
| WO | WO 97/29219 | 8/1997 |
| WO | WO 99/55527 | 11/1999 |

* cited by examiner

*Primary Examiner* — Katherine A Bareford
(74) *Attorney, Agent, or Firm* — Maginot, Moore & Beck, LLP

(57) ABSTRACT

The invention provides a process for applying a heat shielding coating system on a metallic substrate. The coating system comprises at least three individual layers selected from the group of barrier layer, hot gas corrosion protection layer, protection layer, heat barrier layer, and smoothing layer. The coating system is applied to the metallic substrate by low pressure plasma spraying in a single operation cycle. This process enables the layers to be applied in an arbitrary sequence. The process is preferably used in applying a coating system to a turbine blade, particularly a stator or a rotor blade of a stationary gas turbine or of an aircraft engine, or to another component in a stationary or aircraft turbine that is subjected to hot gas.

3 Claims, 2 Drawing Sheets

PROCESS FOR APPLYING A HEAT SHIELDING COATING SYSTEM ON A METALLIC SUBSTRATE

BACKGROUND OF THE INVENTION

The most significant progress, as far as an increase in performance of machines like turbines are concerned, can be realized by increasing the process temperature. However, such increase in process temperature can result in the fact that metallic components of the machine are stressed beyond the limits of their safe operating area such that these components will not endure an operation under these conditions for a long time without damage or at least alteration of their properties.

It is well known in the prior art to make use of coatings applied to such metallic components in order to protect them from such critical operating conditions. For example, ceramic heat shield coats are used to decrease the heat conductivity between process chamber and machine component, or metallic coats to increase the hot gas corrosion resistance of the surface of such metallic machine components. For many years, such coats are also applied by a thermal coating process; nowadays, they are state of the art.

Since in most cases one single coat is not sufficient to resist a complex stress attack,—particularly if the stress is extremely high—, preferably a coating system consisting of a plurality of different layers is applied; thereby, each layer has specific properties particularly suitable to withstand a specific stress. A typical example is to apply a stabilized zirconium dioxide layer, serving as a heat shield layer, onto a metallic layer that is resistant against hot gas corrosion, for example a MCrAlY-layer, whereby M represents a metal on the basis of cobalt, nickel or iron. Preferably, such a layer is applied directly onto the component to be protected.

Following the requirements regarding performance and life span, in the past further layers have been developed to be applied in addition to the two-layer-systems "Stabilized Zirconium Oxide/MCrAlY". Since it can happen at high temperatures that a diffusion of important metal atoms occurs between the substrate and the MCrAlY-layer, the last named layer changes its properties in a negative sense until it cannot fulfill its function any longer. In order to prevent this side effect, an intermediate layer, located between the substrate and the MCrAlY-layer, has been developed, serving either as a diffusion barrier or as a donator of important metal atoms (designated in the following as "barrier layer"). A further intermediate layer is already used for the region between the MCrAlY-Layer and the barrier layer which reduces the oxidative attack to the MCrAlY-layer and improves the adherence to the barrier layer.

PRIOR ART

U.S. Pat. No. 5,238,753 discloses a thermal barrier coating system for high temperature superalloys that includes an intermetallic bond coating on the substrate, e.g. a metallic base body member for an aircraft jet engine turbine blade made of a Cr—Co—Fe-alloy or another alloy on the basis of CO and Ni, and a ceramic topcoat having a columnar grain structure with the columnar axis perpendicular to the surface of the coating. The intermetallic coating is preferably a nickel aluminide or a platinum aluminide, whose upper surface is oxidized during processing to form a thin layer of predominantly aluminum oxide. The ceramic topcoat is preferably zirconium oxide having from about 6 to 20 percent yttrium oxide. The ceramic topcoat is applied to the substrate by a EB-PVD method, i.e. Electron Beam Physical Vapor Deposition, whereby zirconium oxide or yttrium oxide is vaporized from a metallic body member by means of an electron beam gun.

Further methods and examples of applying a heat shield layer system onto a gas turbine blade are disclosed in U.S. Pat. Nos. 5,514,482 and 4,409,659.

In U.S. Pat. Nos. 4,321,310 and 4,321,311, heat shield layer systems are disclosed having a primer layer of the type MCrAlY between the zirconium oxide layer and the metallic substrate. As a possible method of manufacturing a heat shield layer of zirconium oxide, a PVD method is suggested, i.e. method based on physical vapor deposition.

The German Patent Document A1-197 41 961 suggests that it may be advantageous to provide for a chemical binding of the heat shield layer to the metallic primer layer in view of an increased life span and an improved adherence of the heat shield layer system to the substrate. This is realized for example by providing a thin layer of $Al_2O_3$. As a primer layer, as well a layer of a ternary Al—Zr—O compound may be used. The ternary Al—Zr—O compound, e.g. $Al_2Zr_2O_7$ is preferably used for binding a heat shield layer comprising zirconium oxide.

The heat shield layer preferably comprises a metallic substance, particularly zirconium oxide. This metal oxide is preferably alloyed with a stabilizer, e.g. yttrium oxide, to prevent a phase change at high temperatures. The zirconium oxide is alloyed preferably with 3 to 20% by weight, particularly with 8% by weight of yttrium oxide. Also other rare earth substances, like e.g. cerium oxide or scandium oxide, can be used as stabilizers for zirconium oxide.

All these layers are applied by partially very different methods, mainly in order to save costs: The barrier layers are for example galvanically applied; the hot gas corrosion protection layer e.g. by means of LPPS (Low Pressure Plasma Spraying) or HVOF (High Velocity Oxygen Fuel); the protection layer e.g. by means of PVD (Physical Vapor Deposition); and the heat shield layer e.g. by means of APS (Atmospheric Plasma Spraying) or EB-PVD (Electron Beam Physical Vapor Deposition). It is understood that all these different application methods require the provision of a huge amount of available equipment for the different technologies, resulting in partially high manufacturing costs. A particular disadvantage in connection with the EB-PVD method is the extremely high investment required for the electron beam gun, for an apparatus to provide a high-vacuum, for the high-vacuum chamber and for the partial pressure control apparatus. Moreover, the capacities of the particular methods cannot be expanded to all layers. By means of the EB-PVD method, for example, the areas of a substrate that are not directly visible during the coating operation cannot be coated at all or only insufficiently. The more multifarious the choice of the different layers is made, the more complex the variety of the coating technologies will get.

OBJECTS OF THE INVENTION

It is an object of the present invention to replace the plurality of different coating methods, that have been required for applying the different layers, by a single coating method.

SUMMARY OF THE INVENTION

To meet this and other objects, the present invention provides a process for applying a heat shielding coating system on a metallic substrate. The invention is particularly suited where the metallic substrate is a turbine blade, such as a stator or rotor blade of a stationary gas turbine or of an aircraft jet engine. The metallic substrate can also be a component of a stationary gas turbine or of an aircraft jet engine that is subjected to hot gas, such as a heat shield.

The coating system comprises at least three individual layers selected from the following group of layers:
Barrier layer;
Hot gas corrosion protection layer;
Protection layer;
Heat barrier layer;
Smoothing layer;

The coating system is applied to the metallic substrate by low pressure plasma spraying in a single operation cycle. In certain embodiments of the invention, the metallic substrate can be moved within the particle cloud of the plasma jet or spray by a simple rotating or hunting movement.

In the following, the low pressure plasma spraying method (LPPS) is subdivided into the LPPS-Thick Film Method (conventional LPPS) and the LPPS-Thin Film method (new LPPS according to U.S. Pat. No. 5,853,815). As is known from the '815 Patent, the plasma coating operation occurs in a plasma chamber connected to a plasma gas source and a source of powder or liquid to be sprayed inside the chamber. The system disclosed in the '815 Patent includes multiple powder injectors within the chamber, each connected to the common powder source outside the chamber, wherein the multiple injectors are used to create a broad plume plasma steam Up to now, the simplification of the manufacturing process reached by the present invention was not possible because the thickness of the particular layers was different from layer to layer, typically a few micrometers in the case of the intermediate layers up to a few millimeters in the case of the heat shield layers. By using the processes know in the past, either only a thin layer or only a thick layer could be applied to a substrate, due both to technological and economical reasons. The U.S. Pat. No. 5,853,815 discloses a LPPS-Thin Film Method that is fundamentally suitable to apply a heat shielding layer system of the kind referred to onto a metallic substrate.

In this LPPS-Thin Film Method, a plasma torch is created in an atmosphere of particularly low pressure. Compared to older LPPS-Thick Film Methods, a plasma torch results that is considerably enlarged in transversal direction and has a de-focusing effect on a powder jet injected into the plasma torch by means of a conveying gas. Within a period of time, considered short in the field of thermal coating processes, a great area can be treated with the plasma jet containing the dispersed coating material. By using such a LPPS-Thin Film Method, in which a plasma jet with a length of up to 2.5 meters is used, very thin an uniform layers of coating material can be applied to a substrate.

In order to develop a coating system having a well defined density, the coating system has to be built-up with a plurality of individual coat applications. A suitable coating material consists of a mixture of powder particles, the mean particle diameter preferably being less than 50 µm. Each and every individual particle whose diameter is not substantially greater than the afore mentioned mean diameter is partly or fully molten in the plasma jet, with the result that, upon the molten particles hitting the surface of a substrate, a coating layer is created having a well defined density and thickness. The microscopic structure of the applied layer is adjustable, as far as its density and porosity, respectively, is concerned, by suitably selecting the spraying and powder parameters.

The application of the LPPS coating process for the creation of the entire layer system unveils for the first time the possibility to create both thin and thick layers without the need of changing the coating technology and/or equipment, as it has been required up to now. In other words, the use of this LPPS coating process permits application of a multi-layer substrate in a single operation cycle without any interruption to change the coating equipment. Using this LPPS coating process only requires changing the source of powder particles provided to the plasma torch without any need to modify the plasma torch or its configuration within the plasma chamber that would necessarily entail interruption of the spraying operation cycle.

The layer system as a whole can be heat treated after having been applied to a substrate.

The preferred parameters of the layers coming into consideration are summed up in the following table.

TABLE

| LAYER | MATERIAL | THICKNESS OF LAYER |
| --- | --- | --- |
| Barrier Layer | Metallic, particularly metal alloy, preferably NiAl- or NiCr-Alloy | 1 to 20 µm, preferably 8 to 12 µm |
| Hot Gas Corrosion Protection Layer | Metallic, particularly MCrAlY-Alloy (whereby M is Fe, Co or Ni), or Metal Aluminid | 50 to 500 µm, preferably 100 to 300 µm |
| Protection Layer | Aluminum Oxide or Ternary Al—Zr—O-Alloy | 1 to 20 µm, preferably 8 to 12 µm |
| Heat Shield Layer | Oxide ceramic substance, particularly Zirconium oxide containing substance, and stabilizer, particularly rare earth oxides, preferably Yttrium oxide or Cerium oxide | 100 to 2000 µm, preferably 150 to 500 µm |
| Smoothing Layer | Oxide ceramic substance, particularly Zirconium oxide containing substance, and stabilizer, particularly rare earth oxides, preferably Yttrium oxide or Cerium oxide | 1 to 50 µm, preferably 10 to 30 µm |

BRIEF DESCRIPTION OF THE DRAWINGS

In the following, embodiments of the invention will be further described, with reference to the accompanying drawings, in which.

EXAMPLE 1

In the present embodiment for manufacturing a heat shield layer system by means of the LPPS coating process according to the invention, first, a barrier layer is applied under thin film conditions. Thereafter, a primer layer and a hot gas corrosion protection layer is deposited under thick film conditions. Then, a coat of a protection layer is applied under thin film conditions; and finally, a smoothing layer is applied under thin film conditions.

Figure 1:
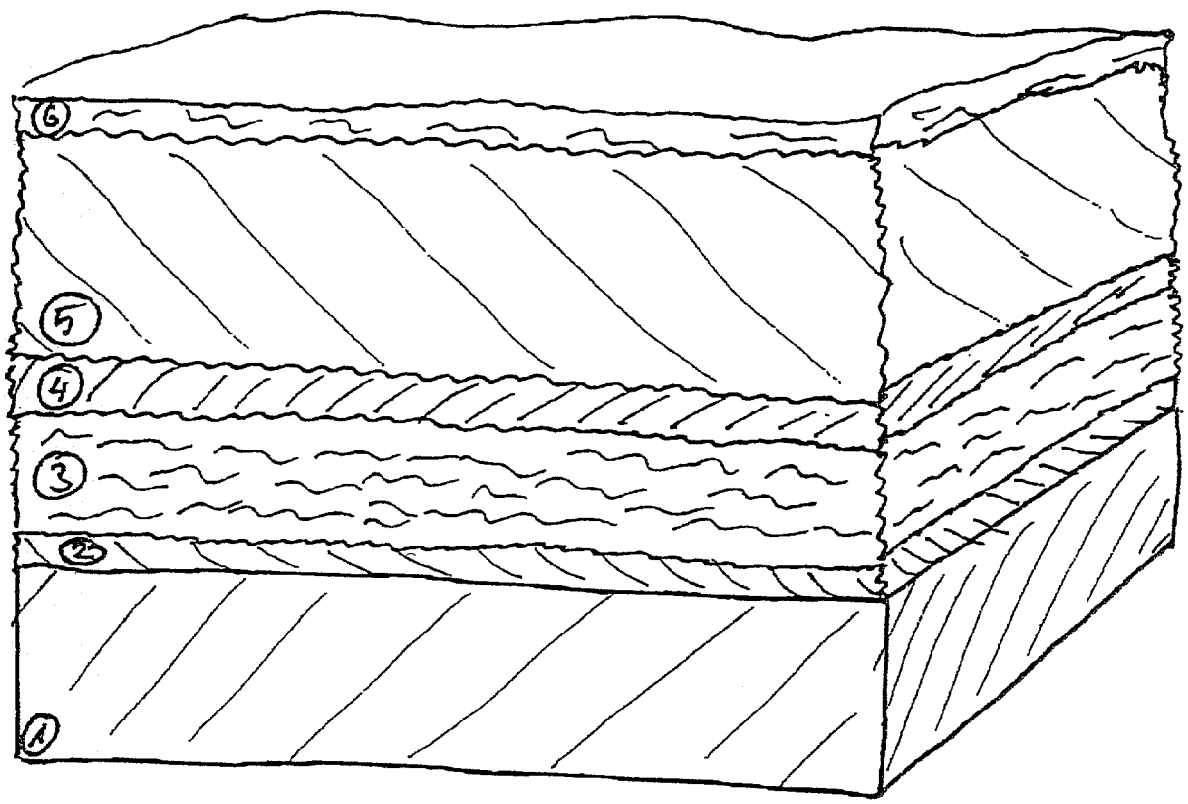
FIG. 1 shows a schematic sectional view of a heat shield layer system manufactured according to the embodiment of the invention described herein after.

The resultant heat shield coating system comprises a structure as seen in FIG. 1. The reference numerals have the following meaning:

| | |
|---|---|
| 1 | The substrate (e.g. Ni- or Co-Alloy); |
| 2 | Metallic barrier layer (e.g. NiAl- or NiCr-Alloy - 1 to 20 µm); |
| 3 | Metallic hot gas corrosion protection layer (e.g. MCrAlY-Alloy - 50 to 500 µm); |
| 4 | Oxide ceramic protection layer (e.g. $Al_2O_3$ - 1 to 20 µm); |
| 5 | Oxide ceramic heat shield layer (e.g. $ZrO_2$-8% $Y_2O_3$ - 100 to 2000 µm); |
| 6 | Oxide ceramic smoothing layer (e.g. $ZrO_2$-8% $Y_2O_3$ - 1 to 50 µm). |

It is understood that the above described embodiment is not to be considered as limiting at all, but that other layer systems different than the one described herein above can be applied, of course within the scope of the appended claims. Particularly, the present invention provides for applying the individual layers in every arbitrary sequence.

EXAMPLE 2

Figure 2:
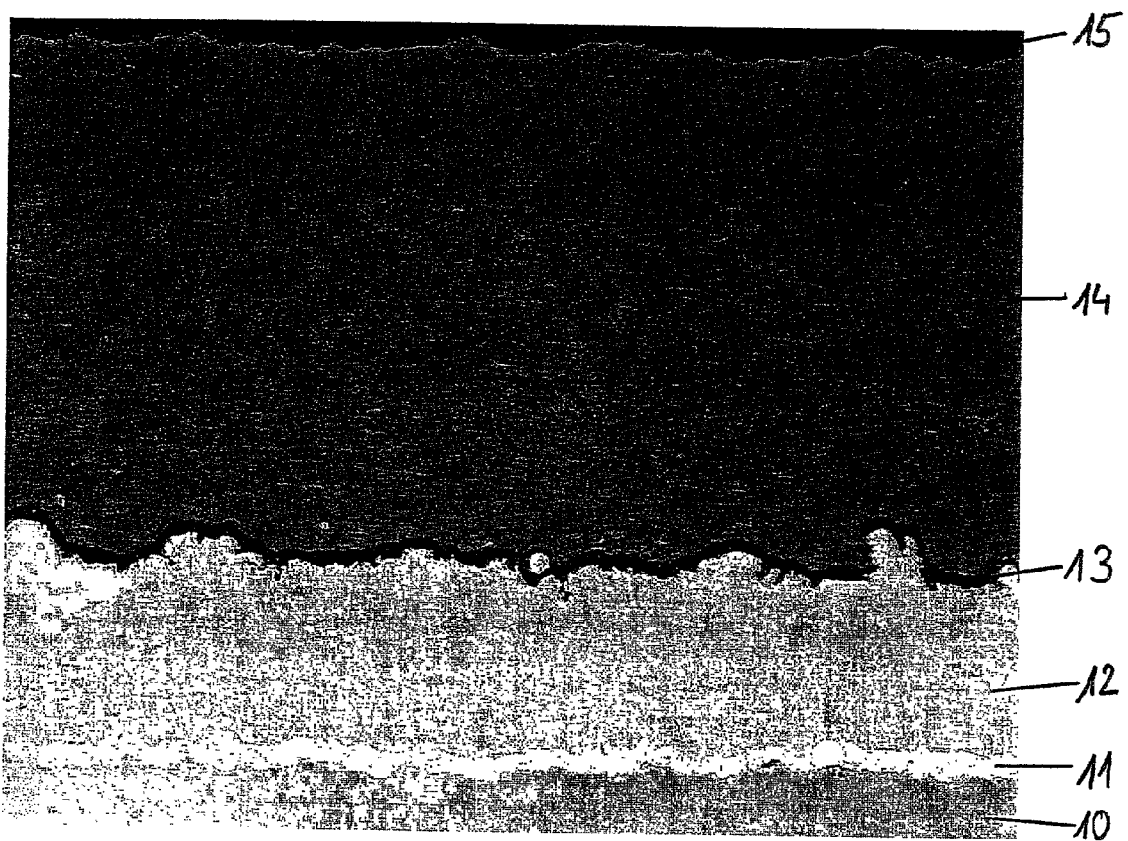
FIG. 2 shows a microscopic picture of a heat shield layer system manufactured according to that embodiment, in which the different layer structures are evident.

Following the process described in Example 1 herein above, the layer sequence illustrated in FIG. 2 has been manufactured. The parameters are as follows:

| | | |
|---|---|---|
| 10 | Substrate | Superalloy Inconel 718, 3 mm thick |
| 11 | Barrier Layer | AMDRY (Ni 80% Cr), 13 µm thick |
| 12 | Hot Gas Corrosion Protection Layer | AMDRY 9951 (Co 32% Ni 21% CR 8% Al 0.5% Y), 137 µm thick |
| 13 | Protection Layer | Metco 105 (99.5% $Al_2O_3$) 9 µm thick |
| 14 | Heat Shield Layer | Metco 204, $ZrO_2$-8% $Y_2O_3$, 360 µm thick |
| 15 | Smoothing Layer | Metco 204, $ZrO_2$-8% $Y_2O_3$, 15 µm thick. |

What is claimed is:

1. A process for applying a heat shielding coating system on a metallic substrate, the coating system comprising, starting from said metallic substrate, the following individual layers in the following sequence:
   a metallic barrier layer consisting of a metal alloy;
   a hot gas corrosion protection layer consisting of a MCrAlY-alloy, M being a member of the group consisting of Fe, Co, and Ni, or of a metal aluminide;
   a protection layer for the protection of said hot gas corrosion protection layer;
   a heat barrier layer; and
   a smoothing layer;
   wherein all of the layers of the coating system are applied to the metallic substrate by low pressure plasma spraying in a single coating method without changing the coating technology or equipment;
   in which said protection layer has a thickness of 1 to 20 µm.

2. The process of claim 1 in which said protection layer has a thickness of 8 to 12 µm.

3. A process for applying a heat shielding coating system on a metallic substrate, the coating system comprising, starting from said metallic substrate, the following individual layers in the following sequence:
   a metallic barrier layer consisting of a metal alloy;
   a hot gas corrosion protection layer consisting of a MCrAlY-alloy, M being a member of the group consisting of Fe, Co, and Ni, or of a metal aluminide;
   a protection layer for the protection of said hot gas corrosion protection layer;
   a heat barrier layer; and
   a smoothing layer;
   wherein all of the layers of the coating system are applied to the metallic substrate by low pressure plasma spraying in a single coating method without changing the coating technology or equipment;
   in which said protection layer consists of an aluminum oxide or a ternary Al—Zr—O compound.

* * * * *